United States Patent [19]

Taguchi et al.

[11] Patent Number: 5,155,584
[45] Date of Patent: Oct. 13, 1992

[54] IMAGE RECORDING REPRODUCING APPARATUS SWITCHING IMAGE SENSOR SIGNALS OR REPRODUCED SIGNALS TO AN A/D CONVERTER

[75] Inventors: Tomishige Taguchi, Urawa; Makoto Kondo, Sagamihara, both of Japan

[73] Assignee: Canon Kabushiki Kaisha, Tokyo, Japan

[21] Appl. No.: 718,925

[22] Filed: Jun. 25, 1991

Related U.S. Application Data

[63] Continuation of Ser. No. 515,235, Apr. 27, 1990, abandoned.

[30] Foreign Application Priority Data

Apr. 28, 1989 [JP] Japan .................. 1-109507

[51] Int. Cl.⁵ ............................................ H04N 9/79
[52] U.S. Cl. ........................................ 358/41; 358/14; 358/39; 358/40; 358/181; 358/909
[58] Field of Search ............... 358/41, 43, 21 R, 39, 358/40, 14, 181, 310, 906, 909

[56] References Cited

U.S. PATENT DOCUMENTS

| | | | |
|---|---|---|---|
| 4,485,400 | 11/1984 | Lemelson | 358/85 |
| 4,489,351 | 12/1984 | d'Arc | 358/909 |
| 4,541,010 | 9/1985 | Alston | 358/43 |
| 4,647,976 | 3/1987 | Nakagaki | 358/909 |
| 4,864,391 | 9/1989 | Taguchi | 358/80 |
| 4,864,410 | 9/1989 | Andrews | 358/909 |
| 4,870,509 | 9/1989 | Nagasawa | 360/9.1 |
| 4,939,593 | 7/1990 | Yuuchi | 358/906 |
| 5,047,875 | 9/1991 | Kozuki | 358/909 |

Primary Examiner—Howard W. Britton
Attorney, Agent, or Firm—Fitzpatrick, Cella, Harper & Scinto

[57] ABSTRACT

An apparatus for recording/reproducing an image, includes a unit for switching between an image signal read from an image sensor in units of pixels and a reproduction signal from a recording medium, an A/D converter for converting the image signal from the switching unit into a digital signal, a one-frame solid-state memory for storing the digital image signal, and a processing unit for processing the digital image signal. The processing unit is switched in photographic and reproduction modes to process the image signal stored in the solid-state memory in different operation modes, thereby performing excellent signal processing even if the image signals stored in the solid-state memory have different formats in the photographic and reproduction modes.

24 Claims, 7 Drawing Sheets

| P00 Y00 | P01 Y01 | P02 Y02 | P03 Y03 | --- | | | |
|---|---|---|---|---|---|---|---|
| P10 R-Y (B-Y) | P11 R-Y (B-Y) | P12 R-Y (B-Y) | P13 R-Y (B-Y) | --- | | | |
| P20 Y10 | P21 Y11 | P22 Y12 | P23 Y13 | --- | | | |
| P30 B-Y (R-Y) | P31 B-Y (R-Y) | P32 B-Y (R-Y) | P33 B-Y (R-Y) | --- | | | |

IMAGE RECORDING REPRODUCING APPARATUS SWITCHING IMAGE SENSOR SIGNALS OR REPRODUCED SIGNALS TO AN A/D CONVERTER

This application is a continuation of application Ser. No. 07/515,235 filed Apr. 27, 1990, now abandoned.

BACKGROUND OF THE INVENTION

1. Field of the Invention

The present invention relates to an apparatus for imaging, recording, and reproducing a still image.

2. Description of the Related Art

An electronic still camera which can cause an image sensor to convert an object image into an electrical image signal, can record this image signal in a recording medium, and which has a reproduction circuit, has bee developed in place of a conventional optical camera using a silver chloride film.

Figure 8:
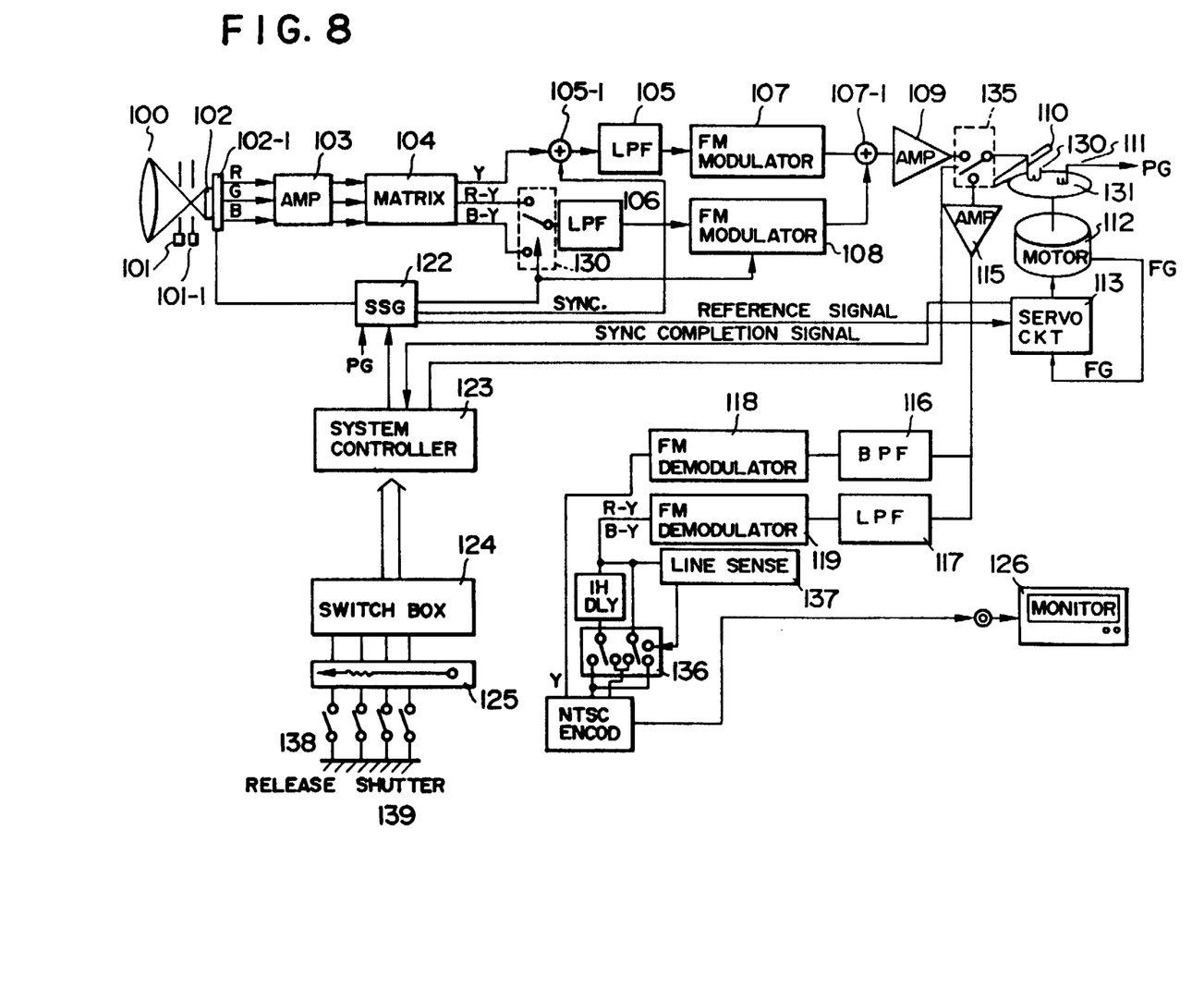
FIG. 8 is a block diagram showing an arrangement of a camera having reproduction function as a related art.

A conventional example of a still camera of this type is shown in FIG. 8.

In this conventional electronic still camera, an object is imaged through a lens 100 and a shutter 101, and an optical image is guided to an image sensor 102 and is converted therein into a charge image. The charge signal is read in synchronism with a sync signal generated by a sync signal generator (SSG) 122 under the control of an image sensor drive circuit 102-1. A motor 112 is controlled by a servo circuit 113 in synchronism with the sync signal from the SSG 122. Upon completion of rotation control, a sync completion signal is supplied to a system controller 123. The system controller 123 supplies a read command to the SSG and the image sensor drive circuit in response to the sync completion signal in order to read image data.

R, G, and B analog data of the read pixels are amplified by an amplifier 103, and the amplified signals are converted into a luminance signal and chrominance signals (color difference signals in this case) by a matrix circuit 104. The chrominance signals are switched by a switch 130 in units of horizontal lines by a switching signal from the SSG 122 so as to be converted into line sequential signals of a still image format. The switched chrominance signals are supplied to a low-pass filter 106. The luminance signal Y is added to a sync (horizontal/vertical) sync signal from the SSG 122 by an adder 105-1, and luminance signal components except for the modulation band are eliminated by a low-pass filter 105. The chrominance line sequential signal wave is modulated by a modulator 108 and added to the modulated wave of the luminance signal by an adder 107-1, so that modulated waves of the chrominance signals are frequency-multiplied, and an output from the adder 107-1 is amplified to an optimal recording level by an amplifier 109.

The signal output from the amplifier 109 is supplied to a recording head 130 through a switch 135 and is concentrically recorded in a recording medium 131. Reference numeral 110 denotes a carrier for radially moving the recording head 130. The above operations include the image sensing process to the recording process.

To reproduce recorded signals, the head 130 is moved to a recorded track by the head carrier 110, and an image signal recorded by the magnetic head 130 is converted into an electrical signal. The electrical signal is supplied to a reproduction amplifier 115 through the switch 135. The signal is then supplied to a band-pass filter 116 and a low-pass filter 117. Outputs from the filters 116 and 117 are input to FM demodulators 118 and 119, respectively. Outputs from the FM demodulators 118 and 119 serve as baseband signals for the luminance and chrominance signals, respectively. The servo circuit 113 compares the phase of a reference signal from the SSG 122 with that of an FG signal from a motor and generates an error signal. The motor 112 is rotated at a speed corresponding to the reproduction signal by using the error signal from the servo circuit 113. As described above, the reproduction image is stabilized, and the chrominance signals are line sequential signals and are synchronized by a line sync circuit consisting of a switch 136 and a line sense circuit 137. The chrominance signals and the luminance signal are converted into an NTSC signal by an NTSC encoder.

In the circuit arrangement described above, the motor 112 must be quickly rotated and stabilized until it is synchronized with the reference signal from the SSG 122 during a time interval from depression of a release button 138 for photography to depression of a shutter button 139. A motor having excellent rise characteristics must be used. When the motor quickly rises, instantaneous power consumption is increased, and a battery capacity must be large. In the conventional circuit arrangement, power consumption is large when the line sync circuit is operated in the reproduction mode and a skew compensator is operated in the field reproduction mode since −h delay lines are used. In addition, in a reproduction image monitor mode, the motor must always be rotated further increasing the power consumption. A reproduction time is shortened when a battery capacity is small as compared with a recording camera without any reproduction function, thus posing a significant problem.

SUMMARY OF THE INVENTION

It is a primary object of the present invention to provide an image recording apparatus which can solve the conventional problems described above.

It is another object of the present invention to provide an image recording/reproducing apparatus capable of various data processing operations with a simple arrangement.

It is still another object of the present invention to provide an image recording/reproducing apparatus which can receive external inputs and generate external outputs.

In order to achieve the above objects according to an aspect of the present invention, there is provided an apparatus for recording/reproducing an image, comprising means for switching between an image signal read from an image sensor in units of pixels and a reproduction signal from a recording medium, an A/D converter for converting the image signal from the switching means into a digital signal, a one-frame solid-state memory for storing the digital image signal, and means for operating the digital image signal, wherein the operating means is switched in photographic and reproduction modes to process the image signal stored in the solid-state memory in different operation modes, thereby performing excellent signal processing even if the image signals stored in the solid-state memory have different formats in the photographic and reproduction modes.

It is still another object of the present invention to provide an image recording apparatus capable of performing image processing by using a one-frame solid-state memory in both the photographic and recording modes at high speed.

The above and other objects, features, and advantages of the present invention will be apparent from the following detailed description of the preferred embodiment in conjunction with the accompanying drawings.

DETAILED DESCRIPTION OF THE PREFERRED EMBODIMENT

According to an embodiment of the present invention, an analog image signal stored in an image sensor such as a CCD is directly converted into a digital image signal by an A/D converter, and the digital image signal is stored in a frame memory. The digital image signal is then filtered by an image processing IC at high speed. Even if a one-frame storage section is not available in the CCD, or a mechanical shutter is not arranged, a frame image can be photographed. In the reproduction mode, a stable image can be reproduced for a long period of time.

Figures 1, 1A:
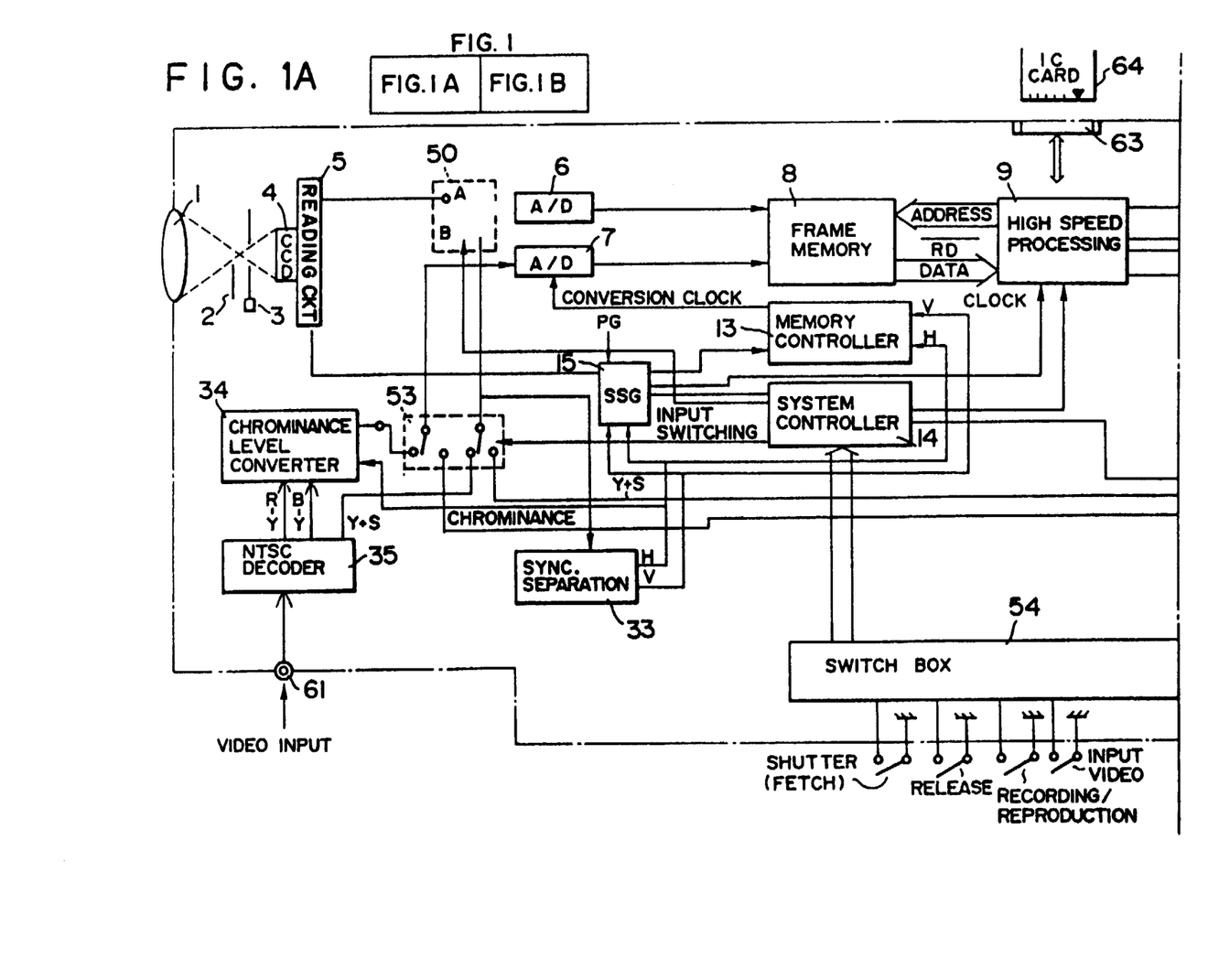
FIGS. 1A and 1B are a block diagram showing an arrangement according to an embodiment of the present invention.
Figure 1B:
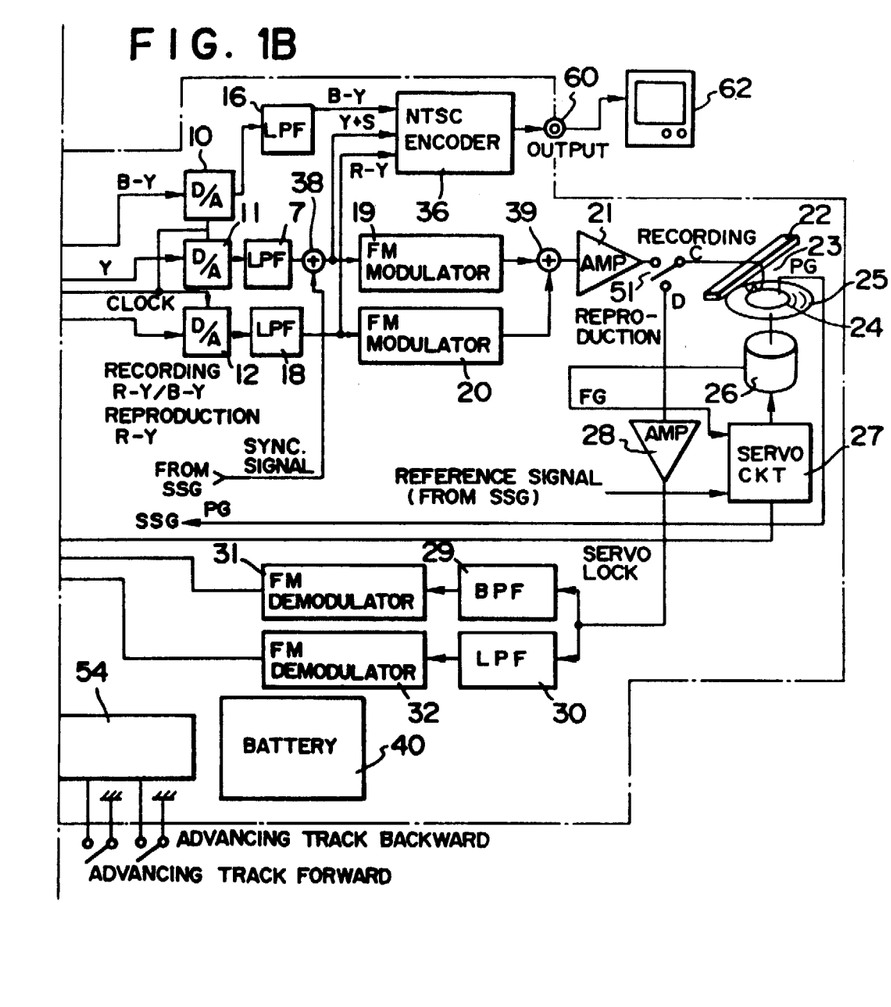

FIG. 1 is a block diagram showing characteristic features of the present invention.

Figure 2:
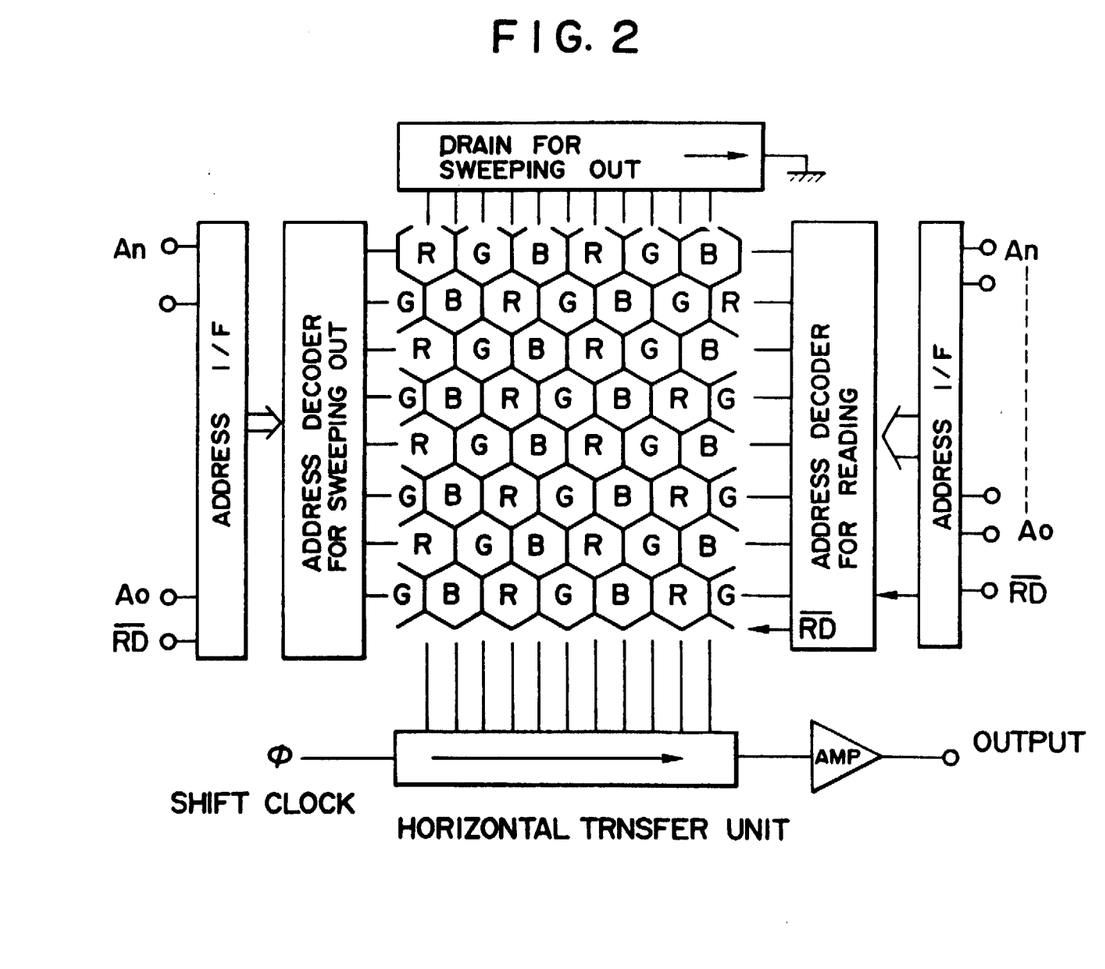
FIG. 2 is a block diagram showing the CCD pixel layout and a reading circuit used in the embodiment shown in FIG. 1.

FIG. 2 is a view showing the layout of CCD pixels used in the present invention.

Referring to FIG. 1, an apparatus for recording/reproducing an image includes a lens 1 for focusing a photographed image on a CCD surface, a shutter 2, an aperture 3, a CCD 4, a reading circuit 5 for reading charges from pixels of the CCD 4, A/D converters 6 and 7, and a frame memory 8. A high speed processing unit 9 converts pixel data stored in the frame memory 8 into an output image signal and comprises an arithmetic unit such as a DSP (Digital Signal Processor) and a ROM for storing permanent programs. The apparatus for recording/reproducing the image also includes three channel D/A converters 10, 11, and 12, three channel low-pass filters (LPFs) 16, 17, and 18, FM modulators 19 and 20, an NTSC encoder 36, an output terminal 60, an external monitor 62; an adder 39, a recording amplifier 21, a carrier 22 having a mechanical structure for moving a magnetic head 23, a PG sense coil 24, a motor 26 for rotating a recording medium 25 such as a disk at a constant speed, a motor servo circuit 27, a memory controller 13, a reference signal generator (SSG) 15, and a system controller 14. The system controller 14 controls a state of the apparatus in accordance with various control signals from a switch box 54. The apparatus further includes a reproduction amplifier 28, a band-pass filter 29 for outputting a luminance signal, a low-pass filter 30 for outputting chrominance signals, FM demodulators 31 and 32, a sync separation circuit 33, an NTSC decoder 35, and a chrominance level converter 34. The chrominance level converter 34 also has a function of converting the input R-Y and B-Y signals (i.e., color difference signals) into a line sequential signal R-Y/B-Y.

A switch 50 is set at the A position in the photographic mode and at the B position in an external input mode.

A switch 51 is set at the C position in the photographic mode or a recording mode for recording an image fetched in the memory 8 in the magnetic recording medium 25, and at the D position in the reproduction mode for reproducing an image signal from the recording medium 25.

A switch 53 is used to switch between an external image input and a reproduction signal from the recording medium 25.

The switch box 54 is used to externally control a camera operation.

The apparatus has the output terminal 60 connected to an external monitor, an external input video terminal 61, the external monitor 62, an IC card connector 63 for outputting data from the high speed processing unit 9 to an external device, and an IC card 64.

DESCRIPTION OF OPERATION

In operation, the camera is directed to an object (not shown) and a two-step release button is slightly depressed to the first-step position. The system controller 14 starts supplying power to the CCD 4, the drive circuit 5, the A/D converters 6 and 7, the SSG 15, the frame memory 8, the memory controller 13, the servo circuit 27, and the disk motor 26. The SSG 15 supplies the reference signal to the servo circuit 27 to rotate the disk motor 26 at a constant speed, thereby phase-locking the servo circuit 27 with the PG signal from the disk motor 26.

When the shutter button is depressed, the aperture 3 is opened to obtain an optimal exposure state. The CCD 4 converts light from the object into a charge signal for a predetermined period of time and accumulates the charge signal (electronic shutter). The pixel layout of the CCD 4 is shown in FIG. 2. R, G, and B color filters are adhered to the pixels in the row direction, as shown in FIG. 2. The color components in the adjacent rows are offset from each other by a ⅓ pixel pitch in the column direction, and pixels in the adjacent rows are offset from each other by a ½ pixel in the row direction. The charge signals of the pixel data of the CCD are swept from a drain for sweeping out, so that the charge amount becomes zero. Addresses of the CCD are designated by an address decoder for reading, and charges are accumulated until the accumulated charges are extracted from a horizontal transfer unit. This time interval is defined as the shutter time of the electronic shutter. The charges accumulated in the CCD 4 are transferred and read row by row to the horizontal transfer unit and are supplied to the A/D converter 6. Therefore, the charges are sequentially converted into digital signals.

Figure 3:
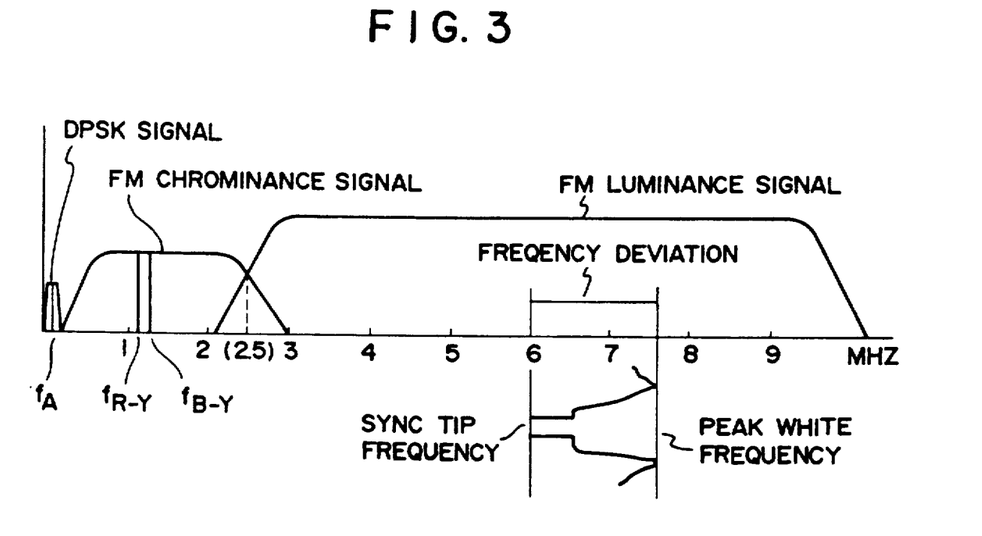
FIG. 3 is a graph showing FM frequency deviations when a signal is recorded in a magnetic disk of the embodiment shown in FIG. 1.
Figure 4:
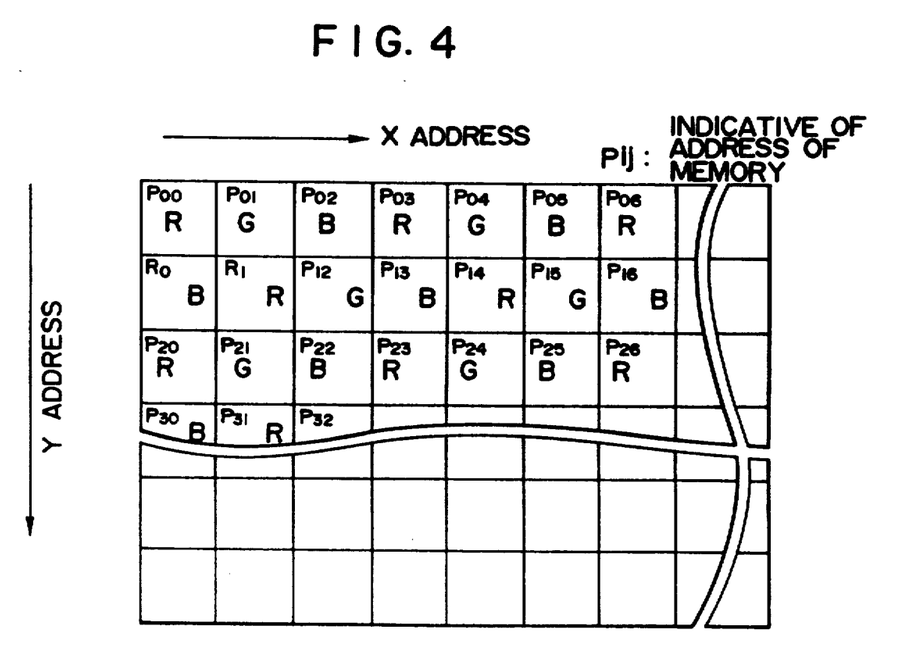
FIG. 4 is a view showing the way of fetching of CCD pixel data in a frame memory.
Figure 7:
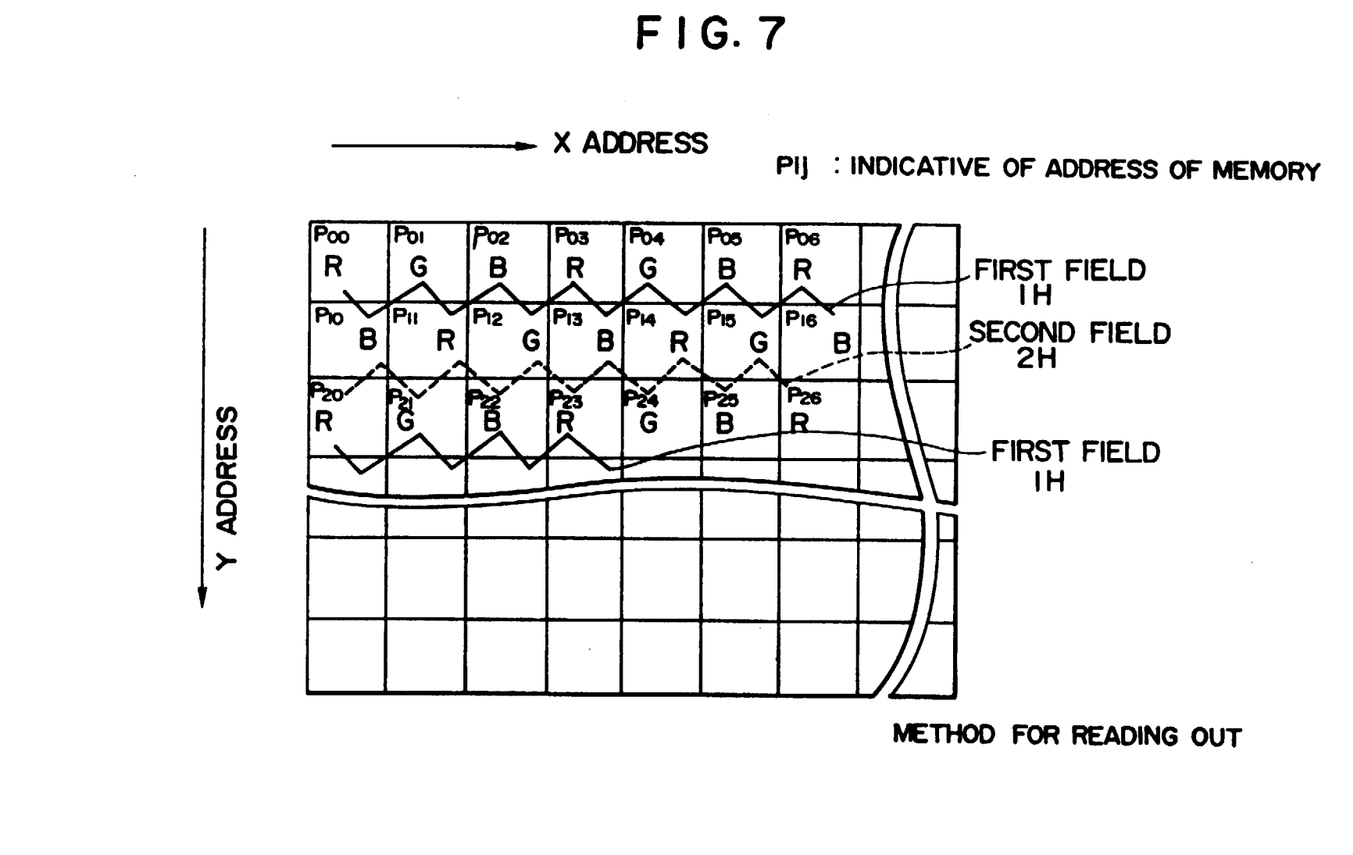
FIG. 7 is a view showing a method for converting image data in the memory into chrominance line sequential signals.

The digital CCD pixel data are sequentially stored in the frame memory 8, as shown in the layout of FIG. 4 and are kept stored until the magnetic disk 25 is rotated at a constant speed. When the speed of the magnetic disk 25 becomes constant, the servo circuit 27 sends a servo lock signal to the system controller 14, thus indicating that the speed is constant. The high speed processing unit 9 starts conversion of object information output from the CCD 4 and stored in the frame memory 8 into signals having a suitable recording format for the magnetic disk 25. This processing scheme will be described in detail below. As shown in FIG. 7, signals of a first field 1H are read, and then signals of a second field 2H are read in order, as indicated by, respectively, solid and dotted lines in FIG. 7. More specifically, reading continues in an order of R, G, B, R, G, B... regardless of the pixel layout of the CCD. The processing unit 9 calculates the luminance signal $Y=0.3R+0.6G+0.1B$ and the signal R-Y/B-Y. Note that the signal R-Y/B-Y represents a line sequential signal. It is possible to output the line sequential data to the external IC card 64 through the IC card connector 63. By this arithmetic operation, the digital luminance signal Y and the line sequential signal R-Y/B-Y are calculated in synchronism with a clock signal from the SSG 15. The outputs from the high speed processing unit 9 are supplied to the D/A converters 10, 11, and 12 and are converted into analog signals. At this time, the conversion frequency of the D/A converter is determined in accordance with a band which allows recording on the magnetic disk. The bandwidth of the luminance signal Y is limited by the low-pass filter 17, and the bandwidths of the signals B-Y and R-Y are limited by the low-pass filters 16 and 18, respectively. The band-limited luminance signal Y is added to the sync signal from the SSG 15 by an adder 38, and a signal Y+S is FM-modulated. The signal R-Y is also modulated in a similar path. The center frequencies in modulation of the luminance signal and the color difference signals (chrominance signal) are defined, as shown in FIG. 3. The outputs from the modulators 19 and 20 are added by the adder 39, and a frequency-multiplexed output from the adder 39 is supplied to the magnetic head 23 through the recording amplifier 21. When a one-frame image is recorded, the head carrier 22 shifts the head 23 to a radially inward position, and the next photographic operation is performed. At this time, when the release button has been depressed, the motor 26 is kept rotated. However, when the release button is released, the motor 26 is stopped, and the CCD 4, the charge reading circuit 5, the two channel A/D converters 6 and 7, the frame memory 8, the high speed processing unit 9, the D/A converters 10, 11, and 12, and the FM modulators 19 and 20 are powered off. Although the high speed processing unit 9 outputs the signals Y and R-Y/B-Y, another processing scheme may be employed when the recording format of the recording medium is changed. The present invention is applicable to other recording formats.

Reproduction from Magnetic Disk

When the recording/reproduction selection switch is set at the reproduction position, the switch 51 is connected to the D side to supply a reproduction signal from the magnetic head 23 to the reproduction amplifier 28. The reproduction signal is separated into two signals, i.e., the luminance signal and the chrominance signals by, respectively, the band-pass filter 29 and the low-pass filter 30. The separated signals are demodulated into a baseband luminance signal and baseband chrominance signals by the FM demodulated 31 and 32, respectively. The switch 53 is operated to supply the modulated signals to the A/D converters 6 and 7 when a video input switch is kept OFF. The modulated luminance signal includes a sync signal, and the sync signal is separated into vertical and horizontal sync signals by the sync separation circuit 33. The vertical and horizontal sync signals are supplied to the SSG 15 and the memory controller 13. The FG signal from the motor 26 is supplied to the servo circuit 27, and the phase of the FG signal is compared with that of the reference signal from the SSG 15. An output from the servo circuit 27 is used to rotate the magnetic disk 25 at a constant speed. When the motor 26 is accurately rotated, a servo lock signal is output to the system controller 14 to indicate accurate rotation of the motor 26. The system controller 14 supplies an instruction to the SSG 15 to cause it to generate a timing signal for fetching the A/D-converted data in the frame memory 8. The memory controller 13 supplies A/D conversion timing signals to the A/D converters 6 and 7 in synchronism with vertical and horizontal sync signals V and H supplied from the sync separation circuit 33 and supplies a write address signal to the frame memory 8 during the active period of a control signal from the SSG 15. While one-frame data is fetched in the frame memory 8, outputs from the D/A converters 10, 11, and 12 are muted.

Figure 6:
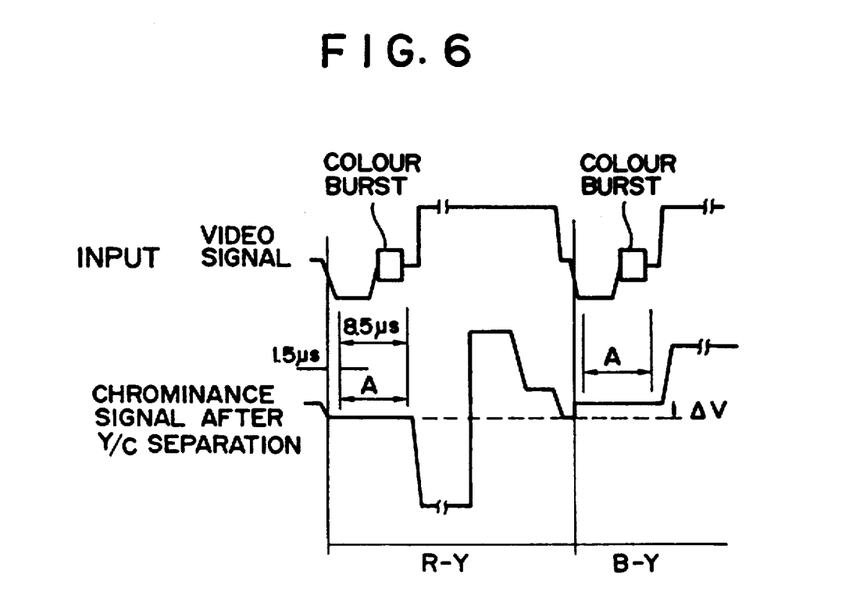
FIG. 6 is a graph showing chrominance line sequential signals.

The chrominance signals supplied to the A/D converter 7 have different DC levels. The high speed processing unit 9 detects a DC level difference during data fetching and determines whether the input signal is R-Y or B-Y. FIG. 6 shows waveform level differences of this signal. Referring to FIG. 6, a signal represented by "input" is an output from the amplifier 28, and a signal represented by the "chrominance signal" is an output from the FM demodulator 32. When data fetching in the frame memory 8 is completed, the SSG 15 supplies an operation timing clock to the high speed processing unit 9.

Figure 5:
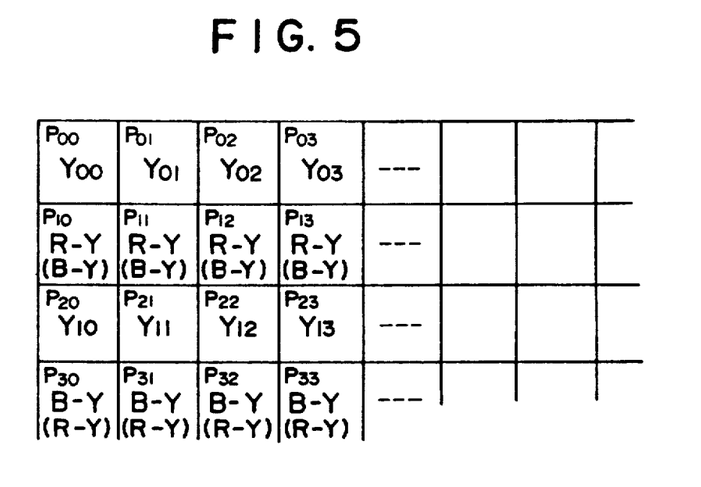
FIG. 5 is a view showing a storage state of reproduction image signals from a magnetic disk in a frame memory.

A format of an image signal written in the frame memory is different from that of a signal accumulated in the photographic mode. In the photographic mode, CCD pixel data are directly written in the original order. However, in the recording mode of the frame memory, the luminance and chrominance signals are independently written, as shown in FIG. 5.

The high speed processing circuit 9 processes luminance digital data and the chrominance line sequential digital data, both of which are written in the frame memory 8. The luminance signal y is output to the D/A converter 11, and the chrominance signals R-Y and B-Y are input to the D/A converters 10 and 12, respectively. The D/A converters 10, 11, and 12 determine D/A conversion timings in accordance with clock signals from the high speed processing unit 9. In this embodiment, these three channel D/A converters use the same clock. However, independent clock signals having different frequencies corresponding to the bandwidths of the D/A converters may be used. The analog luminance signal and the analog chrominance signals are converted into a video signal by the NTSC (PAL1) encoder 36. The video signal can be observed as an image on the monitor 62 through the output terminal 60.

Recording of External Input Signal on Magnetic Disk

When the external input switch is selected, the system controller 14 sets the switch 50 to the B side and connects the switch 53 to the video input side. An input video signal is converted into a luminance+sync signal (Y+S) and color sensor simultaneous signals (R-Y and B-Y) by the NTSC decoder 35. This luminance signal is supplied to the sync separation circuit 33 and separated from the sync signal by the sync separation circuit 33. Meanwhile, the levels of the chrominance signals are changed by the chrominance level converter 34, as shown in FIG. 6, and the signals R-Y and B-Y are alternately output every horizontal period H. The A/D converters 6 and 7 convert the input analog signals into digital signals as describe above in Reproduction from Magnetic Disk.

In this state, when the release button is depressed, the A/D converters 6 and 7, the memory controller 13, and the frame memory 8 are powered. Upon depression of the shutter button (fetching button), the memory controller 13 supplies the A/D conversion clock signals to the A/D converters 6 and 7 and outputs the digital image signal from the A/D converters, a write signal, and an address signal to the frame memory. The format of the image signal written in the frame memory is different from that in the photographic mode. Although the CCD pixel data are written in the original order in the photographic mode, the luminance and chrominance signals are independently written in the frame memory, as shown in FIG. 5.

In this embodiment, the A/D converters 6 and 7, the high speed processing unit 9, and the D/A converters 10, 11, and 12 are constituted by independent blocks. However, these components may be constituted by a single IC developed by the recent integration techniques. In addition, according to this embodiment, the recording medium is exemplified by a magnetic disk. The same effect as described above can be obtained even if an optomagnetic disk, an IC card, or a magnetic tape is used.

According to this embodiment as has been described above, the A/D converters, the frame memory, the D/A converters, and the high speed processing unit are arranged in a still camera, and different processing operations of data from the frame memory are performed in the recording and reproduction modes, thereby obtaining the following effects.

1. An electronic shutter for one frame can be provided. Frame photography can be performed by using a CCD having a small chip size.

2. Even if a one-frame image is recorded in the magnetic disk, an in-line head is not required, and an inexpensive bulk head can be used to record or reproduce a frame image.

3. Since a reproduction image from the memory can be output to a monitor, a reproduction image can be stabilized.

4. Power consumption in the reproduction mode can be reduced.

5. A battery size can be reduced.

In the above embodiment, the A/D converters for A/D-converting image data from the CCD 4 are used as the A/D converters for processing the luminance signal in the external input mode or the reproduction mode. Therefore, the present invention is suitable for processing of high-frequency signals.

As described above, according to the present invention, there is provided a compact, high-speed apparatus for recording/reproducing an image with low power consumption.

What is claimed is:

1. An apparatus for recording/reproducing an image, comprising:
   a) a color image sensor for converting radiation from an object into a color image signal;
   b) means for reproducing a color signal recorded in a medium from the medium to which a signal corresponding to the color image is to be recorded;
   c) an A/D converter;
   d) means for selectively supplying an output from said image sensor or an output from said reproducing means to said A/D converter;
   e) means for inputting a normalized image signal from an external device; and
   f) means for converting the normalized image signal into a signal having the same format as that of the signal reproduced from the medium.

2. An apparatus according to claim 1, wherein said medium comprises a disk-like medium.

3. An apparatus according to claim 1, wherein the normalized image signal is an image signal complying with NTSC standards.

4. An apparatus according to claim 1, wherein the same format is of a line sequential signal.

5. An apparatus according to claim 1, further comprising memory means for storing a one picture digital signal converted by said A/D converter.

6. An apparatus according to claim 2, further comprising means for repeatedly reading the image signal from said memory means and supplying the image signal to a monitor.

7. An apparatus according to claim 1, further comprising means for outputting to an external device a signal according to digital data A/D converted by said A/D converter.

8. An apparatus according to claim 7, wherein said external device comprises an IC card memory.

9. An apparatus for recording/reproducing an image, comprising:
   a) means for switching between a color image signal read from an image sensor and a reproduction signal from a recording medium;
   b) an A/D converter for converting the color image signal from said switching means into a digital image signal;
   c) a static memory for storing the digital image signal of at least one picture;
   d) color processing means for performing digital color processing of the digital image signal; and
   e) control means for switching said processing means between image picking up and reproduction modes.

10. An apparatus according to claim 9, wherein said image sensor comprises a color image sensor.

11. An apparatus according to claim 9, wherein said control means switches said processing means in response to a switching operation of said switching means.

12. An apparatus according to claim 9, wherein said processing means comprises means for calculating a Y signal and a line sequential R-Y/B-Y signal from given signals in the image picking up mode.

13. An apparatus according to claim 9, wherein said processing means comprises means for calculating a Y signal and a line sequential R-Y/B-Y signal from given signals in the reproduction mode.

14. An apparatus according to claim 9, wherein said recording medium comprises a disk-like medium.

15. An apparatus according to claim 9, further comprising:
   means for outputting to an external device a signal according to digital data A/D converted by said A/D converter.

16. An apparatus according to claim 15, wherein said external device comprises an IC card memory.

17. An apparatus for recording/reproducing an image comprising:
   a) means for switching between an image signal read from an image sensor and a reproduction signal from a recording medium;
   b) a static image memory for storing one-picture of digital image signals;
   c) color processing means for performing digital color processing of the one-picture digital image signal stored by said static image memory; and
   d) control means for controlling the digital color processing of said processing means in accordance with said switching means.

18. An apparatus according to claim 17, wherein said image sensor comprises a color image sensor.

19. An apparatus according to claim 17, wherein said processing means comprises means for calculating a Y signal and a line sequential R-Y/B-Y signal from given signals in an image picking up mode.

20. An apparatus according to claim 17, wherein said processing means comprises means for calculating a Y signal and a line sequential R-Y/B-Y signal from given signals in a reproduction mode.

21. An apparatus according to claim 17, wherein said recording medium comprises a disk-like medium.

22. An apparatus according to claim 17, further comprising:
   an A/D converter for digitizing signals output by the image sensor; and
   means for outputting to an external device a signal corresponding to digital data A/D converted by said A/D converter.

23. An apparatus according to claim 22, wherein said external device comprises an IC card memory.

24. An apparatus for recording/reproducing an image, comprising:
   a) an image sensor for converting radiation from an object into an image signal;
   b) means for reproducing a signal recorded in a medium from the medium to which a signal corresponding to the image is to be recorded;
   c) an A/D converter;
   d) means for selectively supplying an output from said image sensor or an output from said reproducing means to said A/D converter;
   e) means for inputting a normalized image signal from an external device; and
   f) means for converting the normalized image signal into a signal having the same format as that of the signal reproduced from said medium.

* * * * *

UNITED STATES PATENT AND TRADEMARK OFFICE
CERTIFICATE OF CORRECTION

PATENT NO. : 5,155,584
DATED : October 13, 1992
INVENTOR(S) : TAGUCHI ET AL.

It is certified that error appears in the above-identified patent and that said Letters Patent is hereby corrected as shown below:

ON THE TITLE PAGE, ITEM [54]

Line 1, "IMAGE RECORDING REPRODUCING" should read --IMAGE RECORDING/REPRODUCING--.

COLUMN 1

Line 1, "IMAGE RECORDING REPRODUCING" should read --IMAGE RECORDING/REPRODUCING--.
    Line 13, "a still" should read --an--.
    Line 18, "bee" should read --been--.

COLUMN 2

Line 32, "rotated" should read --rotated,--.

COLUMN 3

Line 10, "a block diagram" should read --block diagrams--.

COLUMN 5

Line 10, "8" should read --8,--.

COLUMN 6

Line 2, "demodulated" should read --demodulators--.

UNITED STATES PATENT AND TRADEMARK OFFICE
CERTIFICATE OF CORRECTION

PATENT NO. : 5,155,584

DATED : October 13, 1992

INVENTOR(S) : TAGUCHI ET AL.

Page 2 of 2

It is certified that error appears in the above-identified patent and that said Letters Patent is hereby corrected as shown below:

COLUMN 7

Line 16, "describe" should read --described--.
    Line 37, "the" should be deleted.

COLUMN 8

Line 30, "one picture" should read --one-picture--.
    Line 32, "claim 2," should read --claim 5,--.

Signed and Sealed this

Second Day of November, 1993

Attest:

BRUCE LEHMAN

Attesting Officer

Commissioner of Patents and Trademarks